United States Patent
Guyot

[19]
[11] Patent Number: 5,950,565
[45] Date of Patent: Sep. 14, 1999

[54] ANIMAL HUSBANDRY CONTAINMENT APPARATUS

[76] Inventor: Jean Noel Guyot, Box 179, Oak Bluff, Manitoba, Canada, R0G 1M0

[21] Appl. No.: 09/043,435
[22] PCT Filed: Sep. 20, 1996
[86] PCT No.: PCT/CA96/00629
    § 371 Date: Mar. 19, 1998
    § 102(e) Date: Mar. 19, 1998
[87] PCT Pub. No.: WO97/10706
    PCT Pub. Date: Mar. 27, 1997

Related U.S. Application Data

[63] Continuation-in-part of application No. 08/532,876, Sep. 22, 1995, abandoned.
[51] Int. Cl.$^6$ ............................. A01K 1/01; A01K 1/02
[52] U.S. Cl. .................... 119/454; 119/447; 119/479; 119/512; 119/519; 119/521; 119/527
[58] Field of Search ............................ 119/521, 523, 119/529, 530, 448, 458, 450, 502, 520, 516, 454, 524, 519, 14.03, 455, 480, 417, 464, 500, 475, 485, 496, 456, 481, 509, 170

[56] References Cited

U.S. PATENT DOCUMENTS

| | | |
|---|---|---|
| 3,727,581 | 4/1973 | Brent . |
| 3,824,958 | 7/1974 | Parady, Jr. . |
| 4,208,279 | 6/1980 | Varani . |
| 4,249,461 | 2/1981 | Christenson et al. . |
| 4,292,927 | 10/1981 | Sassmann . |
| 4,566,404 | 1/1986 | Instone et al. . |
| 4,697,547 | 10/1987 | Malestein . |
| 5,074,248 | 12/1991 | Loader . |
| 5,107,792 | 4/1992 | Bugl et al. . |
| 5,890,454 | 4/1999 | Moore, Jr. . |

FOREIGN PATENT DOCUMENTS

| | | |
|---|---|---|
| 0 058 030 | 8/1982 | European Pat. Off. . |
| 2 333 724 | 1/1977 | France . |
| 1125827 | 9/1968 | United Kingdom . |
| WO95/28829 | 11/1995 | WIPO . |

Primary Examiner—Peter M. Poon
Assistant Examiner—Yvonne R. Abbott
Attorney, Agent, or Firm—Adrian D. Battison; Murray E. Thrift

[57] ABSTRACT

A system for housing animals in animal husbandry, particularly for raising pigs comprises a separately transportable container (15) manufactured from metal walls (20–24) which is individually supplied with a fan ventilation system (37), a bottom manure container and a feed supply (60). The animals can be transported in the container (15) and maintained in the container (15). The container can be located in rows of the container along a central alleyway (10) through which the animals can be moved and which supplies the necessary facilities. In one use of the system, the animals can be transported to a position adjacent to but spaced from a new location and maintained in quarantine until the possibility of disease is passed. In a further process for the Isowean system of raising pigs, the nursery stage between the farrowing stage and the finisher stage is carried out in the containment vessel thus avoiding additional movement of the animals which is stressful for the animals.

18 Claims, 5 Drawing Sheets

ANIMAL HUSBANDRY CONTAINMENT APPARATUS

This application is a continuation in part of application Ser. No. 08/532,876 filed Sep. 22, 1995 and now abandoned.

BACKGROUND OF THE INVENTION

This invention relates to an animal husbandry containment apparatus for containing and raising animals for market and to a method of raising animals.

The present apparatus is particularly designed for containing and raising pigs but can be modified in manner which will be known to one skilled in the art to make the system suitable for raising other animals including poultry.

It is well known that animals require, in the intensive farming situation which today's economics demand, an enclosure in which the animals are contained and housed with supply systems for supplying feed and water, extraction systems for extracting the manure and ventilation systems for communicating fresh air to maintain the temperature stable. As farming becomes increasingly important, the buildings and the farms are becoming also larger. Also there is an increasing specialization in animal husbandry so that animals are moved form one farm or location to another for the different stages of their life from birth to market. Disease is a significant problem in any such operation since the communication to a herd of a new disease by a recently arrived animal can cause destruction of the whole herd or at least significant losses in treating the disease.

One proposal for separate compartments for containing the animals which are collated together into a system is set out in a magazine article in "The Furrow" dated April 1981, which proposes a system known as "pig train" in which there is provided a series of compartments with the pigs spending about thirty days in each compartment and then moving from each compartment to the next. It is stated that the compartments are prefabricated and need only to be hoisted onto two concrete strips and connected to the heat, water and power supply.

However there remains a necessity for improvement in apparatus and methods for animal husbandry in view of these significant developments in the industry.

SUMMARY OF THE INVENTION

It is one object of the present invention, therefore, to provide an improved apparatus and method for use in animal husbandry.

According to one aspect of the invention there is provided an animal husbandry containment apparatus comprising:

a rectangular animal containment vessel having a horizontal bottom wall, a horizontal top wall, two vertical end walls and two vertical side walls with the walls interconnected and structurally supported to define an integral, separately movable element;

the walls being substantially closed so that the vessel is substantially closed;

the containment vessel having a slat floor raised above the bottom wall to define a manure containment area on the top of the bottom wall and below the slat floor, the manure containment area being closed by bottom portions of the end walls and the side walls;

the containment vessel having an air flow inlet opening in one wall for injecting fresh air into the vessel and an air flow outlet opening in one wall for release of stale air from the vessel;

the containment vessel having a door in the one end wall above the bottom portion so as to communicate with the vessel to allow entry into and exit from the vessel of the animals;

and feeding means for feeding the animals in the vessel.

According to a second aspect of the invention there is provided a method of animal husbandry comprising:

providing a rectangular animal containment vessel having a horizontal bottom wall, a horizontal top wall, two vertical end walls and two vertical side walls with the walls interconnected and structurally supported to define an integral, separately movable element;

the walls being substantially closed so that the vessel is substantially closed;

providing in the containment vessel a slat floor raised above the bottom wall to define a manure containment area on the top of the bottom wall and below the slat floor, the manure containment area being closed by bottom portions of the end walls and the side walls and including discharge means for discharging manure from the containment area;

providing in the containment vessel an air flow inlet opening in one wall for injecting fresh air into the vessel and an air flow outlet opening in one wall for release of stale air from the vessel;

providing in the containment vessel a door in the one end wall above the bottom portion so as to communicate with the vessel to allow entry into and exit from the vessel of the animals;

providing in the containment vessel feeding means for feeding the animals in the vessel;

transporting the containment vessel from a remote location to a husbandry location for raising the animals;

and at the husbandry location connecting the discharge means to a receptacle for manure and supplying feed to the feeding means for raising the animals in the containment vessel.

Preferably the method includes transporting the animals in the containment vessel from the remote location to the husbandry location.

In one preferred mode of operation of the containment apparatus, the remote location comprises a production facility for the animals from which the animals to be transported are selected and preferably the husbandry location includes a main facility for the animals, at which the animals in the containment vessel are maintained in quarantine from the animals in the main facility until the possibility of transfer of disease is determined, whereupon the animals in the containment vessel are transferred to the main facility and the containment vessel is hygienically cleaned and returned to the remote location.

In another preferred mode of operation of the containment apparatus in which the animals are pigs, the pigs are raised firstly in a farrowing pen at a farrowing location from birth to the first growth stage, which is the weaning stage, at which stage they are moved from the farrowing pen to the vessel in which they are transported to a weanling location and in which they are raised at least partly from the first stage to the second stage, which is the grower stage, at which stage they are transported in the vessel to a grower location and moved from the vessel to a grower pen for finishing from the second stage to market weight.

Preferably the vessel contains separate pens each for receiving one family of the pigs from a single sow so that the different families are kept separate in the vessel.

One embodiment of the invention will now be described in conjunction with the accompanying drawings in which:

DETAILED DESCRIPTION

Figure 1:
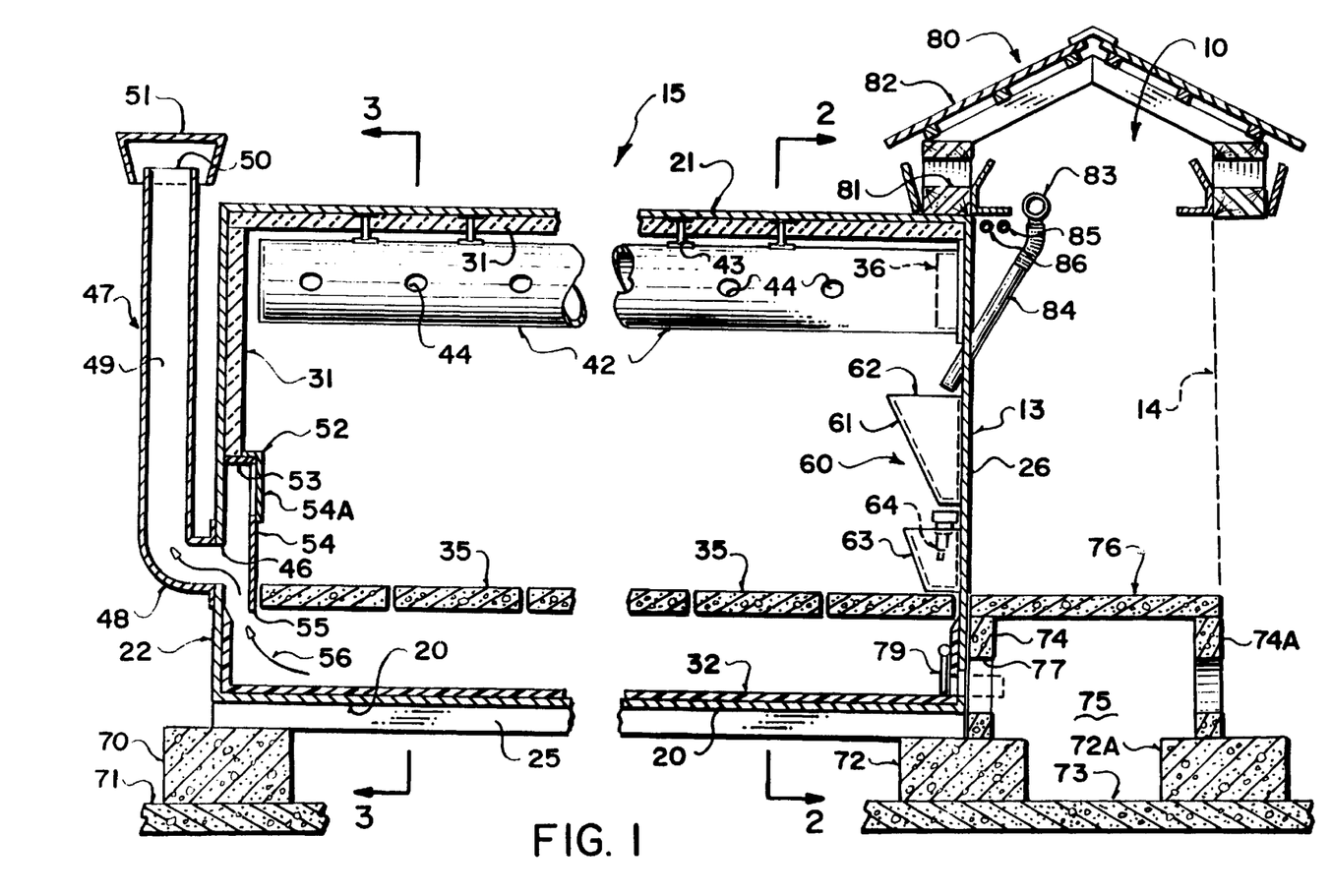
FIG. 1 is cross-sectional view of an apparatus for use in animal husbandry in which the containment vessel is connected to a central alleyway for use with a number of other similar vessels.

The animal husbandry apparatus shown in FIG. 1 comprises containment vessel 15. In one mode of operation of the vessel used in FIG. 5 and described in more detail hereinafter, the vessel can be attached as shown to a central alleyway 10 extending from an inlet end to a closed end and defining a left hand side 13 and a right hand side 14. The central alleyway can receive a number of individual separate vessels 15 arranged in two rows arranged side by side so that each vessel has its front wall adjacent one side of the alleyway.

The apparatus further includes a discharge pipe 18 extending from the alleyway to a manure collection or holding tank 19 spaced from the vessels and from the alleyway at a suitable location from which the holding tank 19 can be emptied when required.

Figure 2:
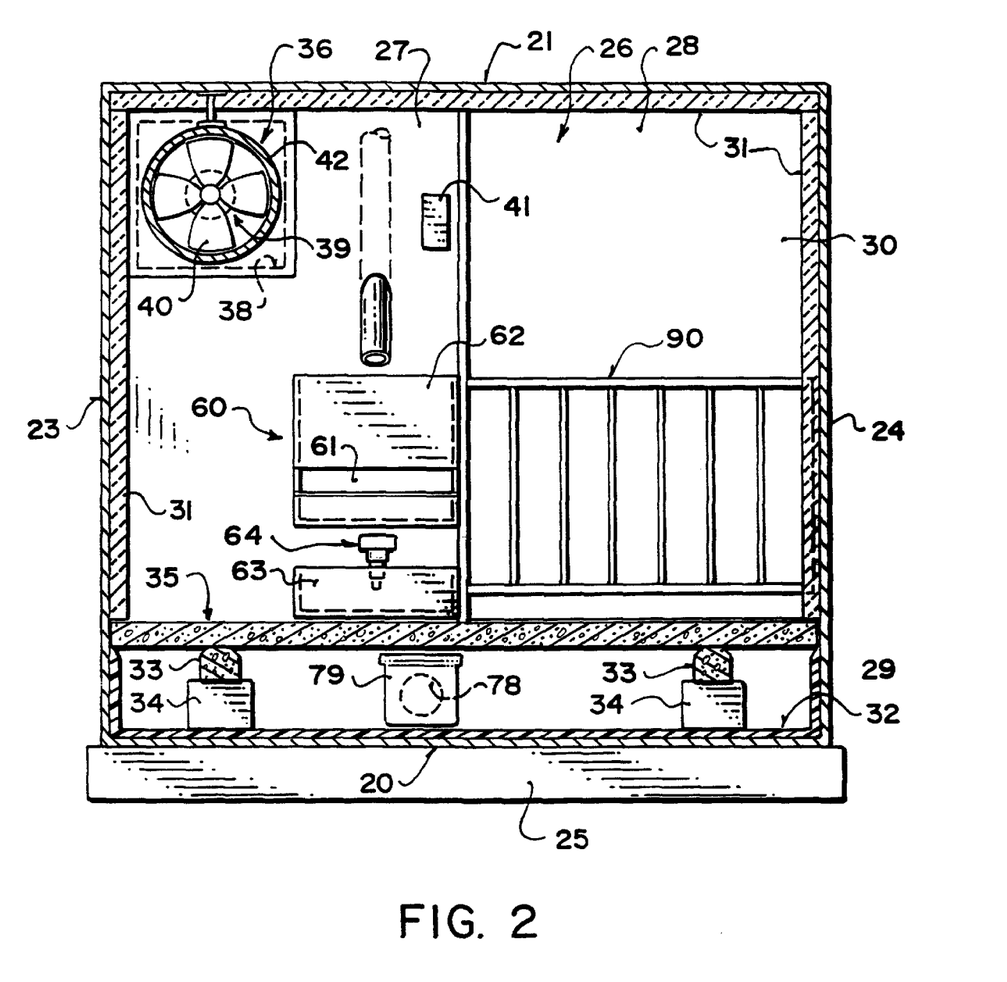
FIG. 2 is a cross-sectional view along the lines 2—2 of FIG. 1 showing the vessel
Figure 3:
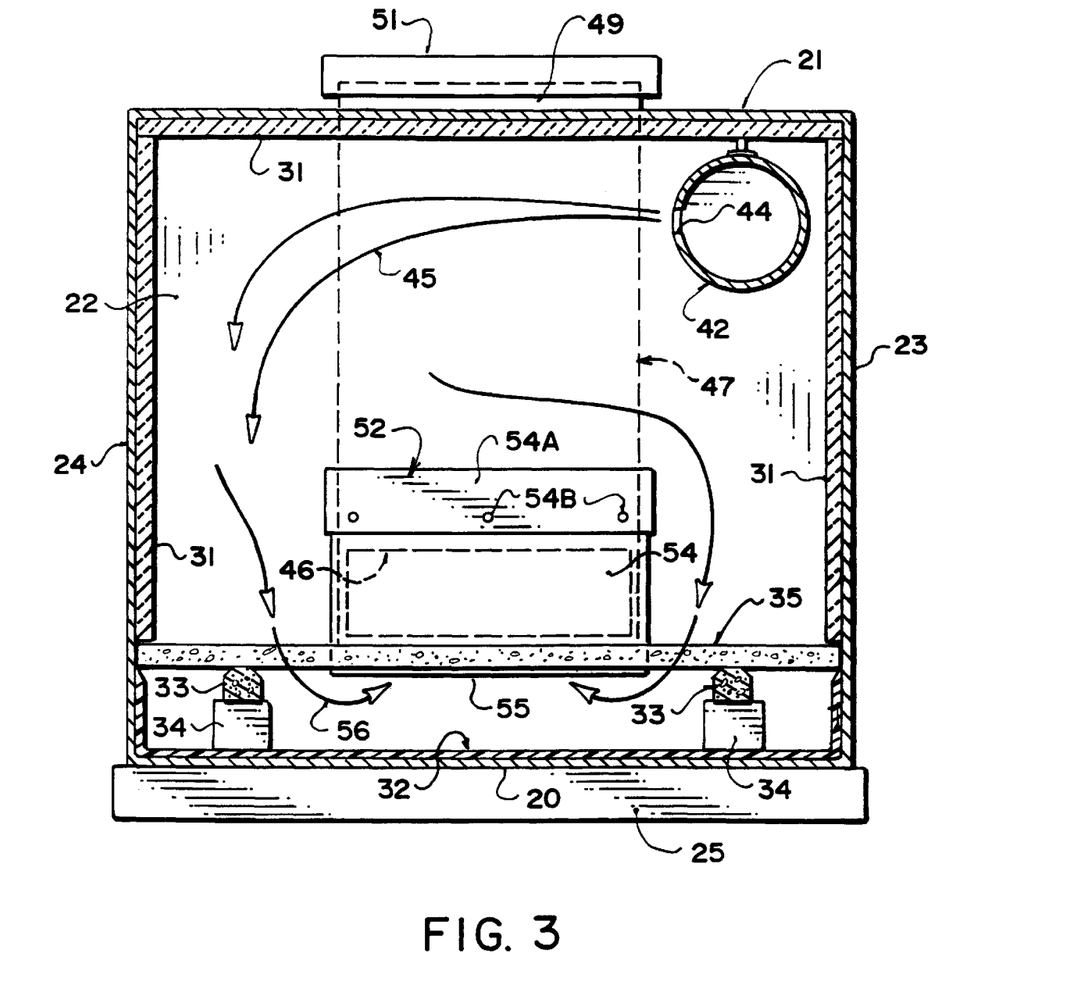
FIG. 3 is a cross-sectional view along the lines 3—3 of FIG. 1 again showing the vessel.

Each vessel 15 is rectangular in shape and is formed from metal so as to define a horizontal metal sheet bottom wall 20, a horizontal sheet metal top wall 21, a vertical sheet metal rear wall 22 and vertical sheet metal side walls 23 and 24. These sheet metal walls are welded together and mounted on a frame 25 formed by longitudinally transverse beams. The metal structure thus formed provides an integral element which can be separately moved and transported. In one practical example, the metal containment vessel is formed by a container of the type used for transportation so that the container is integral and structurally rigid in view of the fact that it is used to transport goods and can be lifted and moved while carrying those goods and particularly the animals contained therein.

The container further includes a front wall 26 which in the example above is formed by two separate doors of the container which can be opened to fully open the front end of the container for loading and unloading. In the arrangement modified for use in the present apparatus, the front wall 26 is modified so that one of the doors indicated at 27 is fixed and is welded in place to remain closed at all times. The second door 28 is divided into two portions including a bottom portion 29 which is again fixed and is cut from an upper portion 30 which remains movable to move from a closed position fully closing the front wall to an open position allowing access to the one half of the open end of the container vessel.

The selection of the transportation container as the containment vessel provides dimensions of the order of eight feet wide and eight feet high with a length which is variable by selecting different vessels but in one example it is generally of the order of 45 feet.

Each of the side, rear and top walls is covered by a layer of rigid insulation material 31 which is screwed in place to the walls to provide a smooth surface on the inside of the walls and to provide a suitable level of insulation to prevent escape of heat in cold weather and to reduce penetration of heat in hot weather.

The transportation container is further modified by a plastics liner 32 which is laid across the bottom wall 20 and part way up the sides and rear walls. The liner also extends over the bottom portion 29 and part way up the closed door 27 thus forming a bowl or container within the base of the transportation container for receiving manure. On top of the bottom wall 20 and within the liner 32 is mounted a pair of longitudinal rails 33 which are spaced apart across the width of the container and are mounted on suitable support blocks 34 which raise the rails above the bottom wall 20. On top of the rails 33 is mounted a plurality of transverse slat members 35 defining slat floor. The slat floor can use conventional slat materials which is often available concrete material of a length which is equal to the width of the container so that one section of the floor of eight feet in length and approximately two feet in width can be laid across the rails 33. Such sections are arranged side by side along the length of the container so as to form a complete floor defining a series of slats with intervening spaced for allowing manure to pass through the spaces into the manure containment area underneath the slat floor, within the liner and on top of the bottom wall 20.

The container is modified further by the addition of an air inlet system generally indicated at 36 and an air outlet system generally indicated at 37. The air inlet system 36 comprises an opening 38 formed in the closed door 27 with the opening being generally square and positioned at one side wall 23 and at the top wall 21. Within the square opening 38 is mounted a conventional fan 39 with a fan housing connected in the opening and a fan blade assembly 40. The fan is mounted in the closed door 27 of the front wall so as to draw air from the center hallway in front of the front wall as best shown in FIG. 1. The fan is thus entirely separate from the fan of other vessels and does not draw air from any common communication duct and separately electrically controlled by a thermostatically controlled electrical system schematically indicated at 41. The outlet of the fan 36 directs air into an elongate tube 42 formed of a flexible material with that tube being supported from the top wall 21 by a plurality of hangers 43. The tube is cylindrical with a diameter substantially equal to that of the fan and has outlet holes 44 which are arranged in one side of the tube so as to direct air from the tube in a substantially horizontal direction parallel to and adjacent to the top wall 21. The holes 44 are arranged at spaced positions along the length of the tube so that the fresh ventilation air from the center hallway is communicated into the container along the full length of the container and is directed in a manner so that flows around a central axis of the container as indicated at 45.

The air outlet system 37 comprises a rectangular opening 46 in the rear wall at a position closely adjacent but slightly above the slat floor 35. The rectangular opening 46 is cut through the material of the rear wall and through the insulation layer so as to define an opening which is elongate in a direction parallel to the slat floor.

On the outside surface of the rear wall is mounted a discharge duct 47 which has a lower end 48 which is rectangular and connected around the opening 46 so that the air escaping through opening 46 is contained within the lower portion 48. A vertical rectangular chimney 49 extends from the lower portion upwardly to a height slightly above the top wall 21 at which there is provided an open upper end 50 of the chimney for discharge of the exit air with the open upper end being covered by a protective cover 51.

On the inside surface of the rear wall 22 is provided an outlet guide cover 52 which is rectangular so as to define a top wall 53 and a front wall 54 depending downwardly from the top wall in front of the discharge opening 46. The front wall 54 extends downwardly to a lower edge 55 just below the slat floor 35 leaving an opening at the bottom of the front wall 54 between the bottom edge of the front wall 54 and the rear wall 22 through which air can escape upwardly as indicated at 56. Air escaping through the discharge opening 46 is thus drawn upwardly from the area underneath the slat floor 35 that is within the manure collection area defined within the liner 32. The guide housing includes a section 54A above the slat floor which is fastened by screws 54B allowing ready removal so as to allow escape of air into the guide housing from a position above the slat floor for increased air flow when required for increased cooling.

The airflow within the container therefore is generated wholly by the fan which acts to inject the fresh air into the container, the container being otherwise closed thus providing an increased pressure within the container which is reduced by the outflow of air through the discharge opening 46. The outflow air thus passes from the area containing the animals through the slat floor to the manure collection area and then passes, carrying any noxious fumes through the discharge chimney 49 for discharge to atmosphere. This therefore maintains the animal containment area in relative cleanliness and fume free environment.

The container is further modified by the addition of a feeding system generally indicated at 60 which is mounted on the fixed door 27 of the front wall 26. The feeding system comprises a conventional feeder 61 having a hopper 62 for feed and a trough 63 into which the feed can fall. Within the trough is provided a water supply nozzle 64 which can be actuated by the animal to discharge water for drinking. The animal can take feed from the feeder at its own selection without feed falling from the hopper.

The container 15 is mounted so the frame 25 sits at its rear end on a support block 70 carried on a foundation 71. At its forward end, the frame is mounted on a support block 72 carried upon a foundation 73. The block 70 is arranged to be at a slightly increased height relative to the block 72 so that the frame and therefore the container is slightly tilted toward the center alleyway.

The center alleyway comprises a horizontal foundation slab defined by the foundation 73 which extends across the full width of the alleyway and thus supports a similar block 72A on the side 14 for cooperation with the row on that side. On top of the blocks 72 and 72A is provided two concrete walls 74, 74A thus defining on top of the slab 73 and within the walls 74, 74A a channel 75 for receiving manure from the containment vessels. Bridging the concrete walls 74, 74A is provided a slat floor 76 which allows the farmer to move along the alleyway to access each of the containment vessels and allows the animals to be discharged from the containment vessels when required. The height of the concrete walls is arranged so that it matches the height of the slat floor 35 to avoid a step between the slat floor 35 and the slat floor 76.

The concrete walls 74 and 74A have a plurality of holes 77 equal to the number of containment vessels and aligned with the containment vessels. The holes 77 are positioned directly on top of the concrete blocks 72, 72A so that manure running from a discharge hole 78 in the bottom of the front wall can pass through the hole 77 in the concrete wall and into the channel 75 for discharge to the outlet pipe 18. The discharge opening 78 is covered by a flap valve 79 so that it is generally closed by the pressure of the manure against the flap valve pressing the flap valve against the outlet. The flap valve can be opened manually simply by pulling on a suitable operation lever (not shown).

The alleyway is covered by a roof structure 80 including support beams 81 mounted directly on the top wall 21 of the containment vessels at the front wall, with the roofing structure being formed by suitable timbers and a covering roofing material 82. The roof structure provides weatherproofing so that the center alleyway is protected from the elements while the roof structure can be readily manufactured and positioned since it is supported wholly by the containment vessels themselves.

Within the roof structure is provided a feed transportation duct 83 which extends along the length of the alleyway and discharges through a plurality of supply ducts 84 into the individual feeders 60. In addition electrical supply is indicated at 85 and water supply is indicated at 86 both of which are again contained within the roof area of the center alleyway.

The door 28 can be opened onto the alleyway to allow access to the animals contained within the containment vessel. A barred gate 90 is positioned across the open area thus formed by the door 28 so that the animals can be contained while the farmer observes the animals or takes action to deal with the animals. When it is required to release to the animals, the door is opened and the gate also can be opened by a hinging mechanism and latching mechanism (not shown).

While one example of the arrangement of the present invention uses containers which are of the type used for transportation containers, the metal structure can be manufactured specifically for the purpose set forth above provided that the structure so formed is fully closed apart from the door in the front wall and provided that the structure is self-supporting allowing it to be moved from one location to another.

The simple horizontal floor providing a containment area for the manure can be modified by using a corrugated floor so as to form a series of longitudinal channels in the container as opposed to the open containment area within the liner 32. These channels can then communicate downwardly and forwardly to openings in the front wall which cooperate with openings in the concrete walls to allow the discharge of the manure into the channel 75.

It will be appreciated that the above described containment vessel can be used as shown to form with a number of similar containment vessels the animal processing station as shown.

Figure 4:
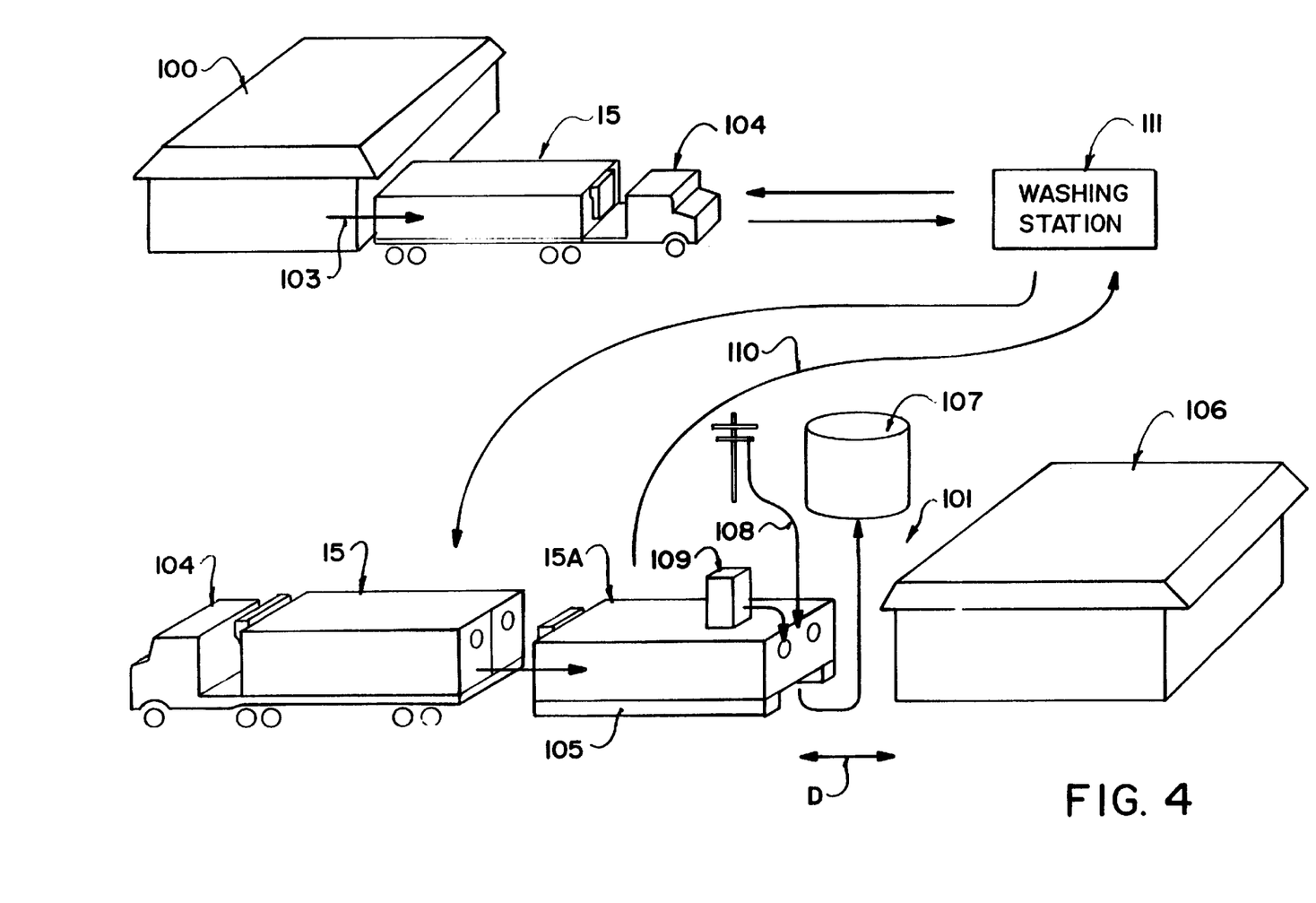
FIG. 4 is a schematic illustration of a first process for farming using the vessels as shown in FIGS. 1, 2 and 3.

One process for use of the containment vessel is shown in FIG. 4.

As described previously, production of animals has become more specialized and the number of animals has been significantly increased by consolidation of farms into a single location. In particular a system known as "Isowean" is now becoming rapidly accepted as it leads to a significant reduction in losses due to transmission of disease.

As is well known and widely used, production of gilts (young sows for farrowing) is concentrated in a first location and those gilts are then shipped to other locations for farrowing and production of piglets.

With movement of animals from one location to another it is necessary to apply considerable care throughout the processing system to ensure hygienic conditions and to prevent growth and transfer of diseases. However in some cases diseases can occur which are then transferred from one location to another location where the animals have no resistance and it is possible for the whole location to be wiped out or significant costs incurred in curing the diseases. This is particularly applicable to the farrowing operation where new gilts are brought in regularly to a barn already containing many existing sows with the possibility that the whole herd can be wiped out by importation of a disease.

The containment vessel of the present invention is therefore particularly useful in such a situation and this operation is shown in FIG. 4. In FIG. 4, therefore, a first location for production of animals (gilts) is indicated at 100 and a second location for production of animals (farrowing sows) indicated at 101. The facilities 100 and 101 are relatively large and contain large number of animals in the concentrated production system.

The containment vessel 15 is therefore moved to the first location 100 where it is loaded with selected animals from the location 100 as indicated schematically by arrow 103. The selected animals are then contained within the containment vessel and then transported in the container vessel 15 on a transport vehicle 104. At the location 101, the vessel 15 is unloaded as indicated at 15A onto a support stand 105 so that the vessel is then free standing is in the same location 101 but separate from a main building 106 of the location 101 in which the main number of animals are housed. The distance D of separation is sufficient to prevent airborn transmission of disease and this is generally of the order of ½ to 1 mile. The vessel 15A is therefore maintained in quarantine adjacent to but separate from the main building 106. The vessel 15A is connected to services at the location including a manure storage container 107 for receiving manure from the lower portion of the container vessel, an electric hook up 108 for powering the fan and any lighting and a feed connection 109 by which feed can be transferred to the feeding system within the vessel 15A.

The quarantine conditions can be properly maintained so that there is no possibility of transferred disease from the animals in the vessel 15A to the main building. In this situation one or more animals from the main building can be transferred into the vessel 15A to join with the animals in the vessel 15A with the possibility of those trial animals having diseases transferred to them from the new animals in the vessel 15A and vice-versa.

After a scheduled period of time for the possibility of transferred disease, the presence of disease in the trial animals is tested to ensure that there is little or no possibility of transferred diseases from the new animals to the main collection of animals within the main building 106. As soon as the quarantine conditions are completed, the animals can be transferred, by moving the vessel to a closer location or by conventional systems from the vessel 15A into the main building for further processing.

The containment vessel 15A is then reloaded onto the transportation vehicle 104 and is transferred as indicated by the arrow 110 to a washing station 111 and then is returned to its initial position at the location 100 or at another location similar to the location 100. Each time the vessel is moved from one location to another it is washed externally to prevent transfer of diseases. When the vessel is emptied of animals it is washed throughout so that it is wholly hygienic for the new animals to be contained. As the vessel is separate from any other structure it can be individually washed and cleaned much more effectively than can a pen in a barn.

The loading systems for loading of the container onto the vehicle 104 are not shown nor described herein since they are well known to one skilled in the art and are commercially available. Similarly the washing station 111 is not shown in detail since this again is of a conventional nature and ensures thorough and hygienic washing of the containment vessel to ensure that there is no possibility of transferred diseases from the vessel to animals contained therein.

The present invention therefore provides a system in which the containment vessel can be used for transportation of the animals and for storing of those animals in quarantine conditions at the new location to prevent the inadvertent transfer of diseases between the different locations.

Figure 5:
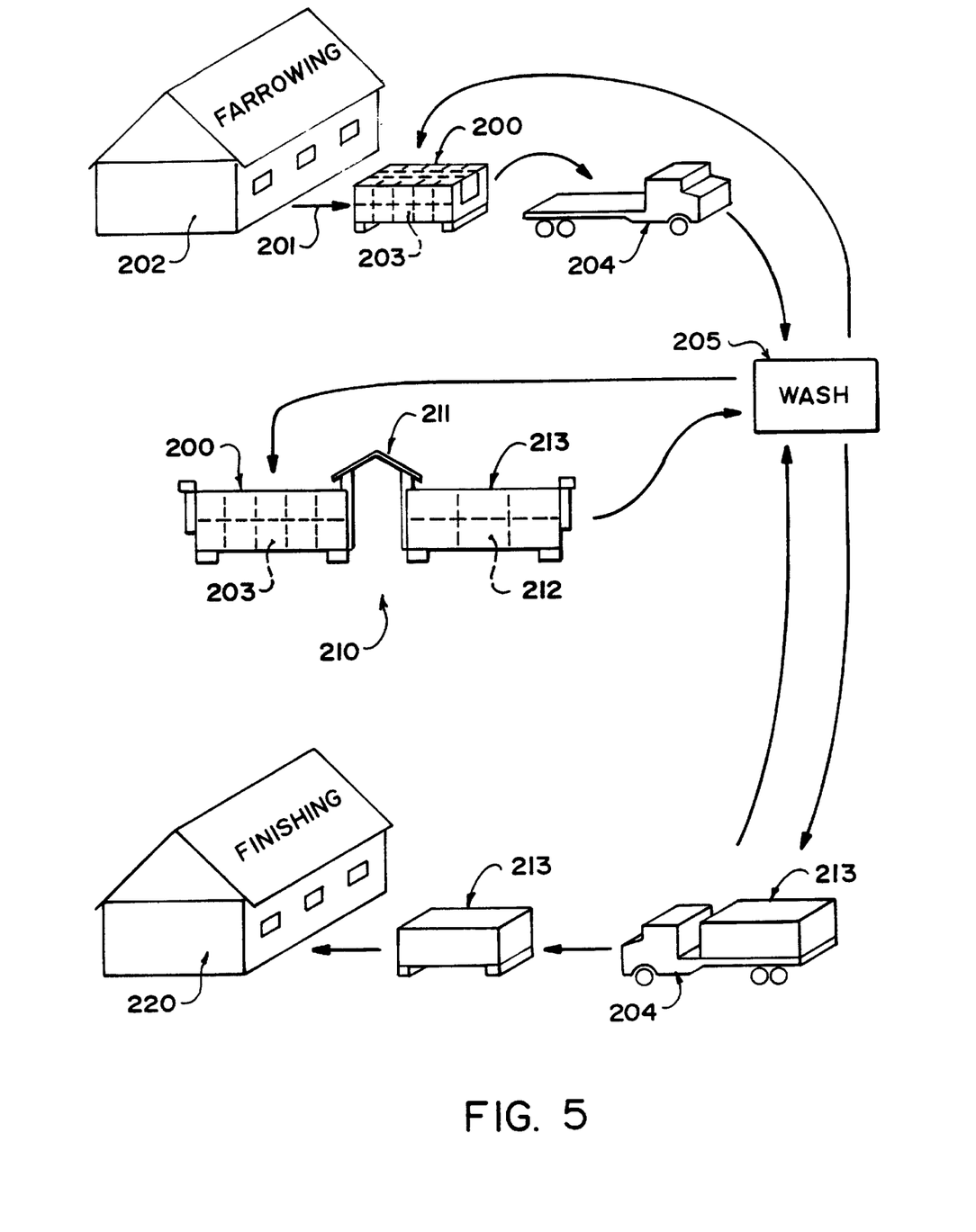
FIG. 5 is a schematic illustration of a second process for farming using the vessels as shown in FIGS. 1, 2 and 3.

Turning now to FIG. 5, there is shown schematically an improvement to the Isowean system of raising pigs.

In the Isowean system, production is carried out at three different locations often, although not always, by different production companies. In the first location there is provided the farrowing system in which the sows are maintained and produce familial litters which are kept with the sow for a period up to eighteen days for feeding from the sow.

At that stage, the piglets are separated from the sow and are moved into a transportation container for transportation to a nursery location. At the location the piglets are moved from the transportation container into the nursery building and are raised from the eighteen day stage for a total of approximately nine weeks when the animal is generally of the order of 50 lbs.

At the end of the weanling stage in the nursery, the animals are again moved into a transportation container and transported to a finishing barn where the animals are moved into the barn and fed and maintained up to market weight, generally of the order of 220 lbs. The finishing barn is emptied before a new batch of pigs from the weanling stage are brought to the finishing barn and the animals are then moved from the finishing barn to market again effectively simultaneously thus emptying the barn for a fresh batch.

The conventional system therefore requires repeated movement of the animals from barn to transportation container and from container to barn. In addition the transportation container simply receives as one batch all of the animals from a different familial litters so that a very high level of stress is applied to the animals both from the movement and from the mixing with other litters which can generate fighting and the stress can lead to onset of diseases.

The containment vessel of the present invention therefore can be used in the Isowean system to reduce the number of movements of the animals. The containment vessel therefore shown in FIG. 5 is indicated at 200 and receives animals as and indicated schematically by the arrow 201 from a farrowing barn 202. The containment vessel 200 contains a plurality of separate cages schematically indicated at 203 each for receiving one familial litter thus keeping the animals in the groups to which they are accustomed.

When the container is filled it is transported on a vehicle 204 through a wash system 205 which washes the exterior of the vehicle and container. The container 200 is then moved to a nursery section generally indicated at 210 at which the containers are set up in a row as previously described in conjunction with a central alleyway 211. The weanlings are then raised from the eighteen day stage for a period of the order of three to four weeks during which the animals grow rapidly to a stage where it may be desirable to move the animals to larger cages as indicated at 212 in a further container 213. The larger cage containers are located on the opposite side of the alleyway 211 so that the animals can be readily moved and maintained in their familial litters. The animals are then raised in the containers 213 until the end of the nursery stage generally after a total of nine weeks. The container 213 is then moved on a vehicle 204 through the wash system 205 to a finishing barn 220 separate from the locations of the farrowing and nursery sections. The container 213 can be unloaded at the finishing barn and the animals kept in the container 213 until the finishing barn is completely ready to receive the new batch.

The system therefore reduces the number of movements since the animals are maintained in the transportation container. In addition the animals are maintained in their familian litters thus reducing the stress of movement and integration thus maximizing comfort for the animals and minimizing losses due to disease and due to reduced food intake.

I claim:

1. A method of animal husbandry comprising:
   providing a rectangular animal containment vessel having a horizontal bottom wall, a horizontal top wall, two vertical end walls and two vertical side walls with the walls interconnected and structurally supported to define an integral, separately movable element;
   the walls being substantially closed so that the vessel is substantially closed;
   providing in the containment vessel a slat floor raised above the bottom wall to define a manure containment area on the top of the bottom wall and below the slat floor, the manure containment area being closed by bottom portions of the end walls and the side walls and including discharge means for discharging manure from the containment area;
   providing in the containment vessel an air flow inlet opening in one wall for injecting fresh air into the vessel and an air flow outlet opening in one wall for release of stale air from the vessel;
   providing in the containment vessel a door in the one end wall above the bottom portion so as to communicate with the vessel to allow entry into and exit from the vessel of the animals;
   providing in the containment vessel feeding means for feeding the animals in the vessel;
   transporting the containment vessel from a remote location to a husbandry location for raising the animals;
   at the husbandry location connecting the discharge means to a receptacle for manure and supplying feed to the feeding means and thereby raising the animals in the containment vessel.

2. The method according to claim 1 including transporting the animals in the containment vessel from the remote location to the husbandry location.

3. The method according to claim 2 wherein the remote location comprises a production facility for the animals from which the animals to be transported are selected.

4. The method according to claim 1 wherein the containment vessel includes a plurality of separate containment cages for separate groups of the animals.

5. The method according to claim 1 including providing an air movement fan mounted on the vessel for drawing air through the inlet opening and at the husbandry location supplying power to the fan.

6. The method according to claim 1 including providing an air guide tube having one end connected to the inlet opening so as to carry the air therefrom with the guide tube extending longitudinally from the wall containing the opening toward an opposed wall, the guide tube having a plurality of holes at spaced positions along its length for releasing the air from the fan into the vessel at spaced positions along the length of the vessel.

7. The method according to claim 6 wherein the wall containing the opening is one end wall of the vessel and wherein the fan and the guide tube are arranged adjacent one side wall and adjacent the top wall with the holes in the guide tube positioned to direct air therefrom substantially parallel to the top wall toward the opposed side wall.

8. The method according to claim 1 wherein the air inlet opening is arranged at one end wall and the air outlet opening is arranged at the opposed end wall.

9. The method according to claim 1 including providing a guide housing on an inside surface of the wall for directing the air from the vessel into the outlet opening wherein the guide housing has an air inlet positioned under the slat floor such that air escaping from the vessel passes through the slat floor into the manure containment area and from the manure containment area into the guide housing.

10. The method according to claim 9 wherein the guide housing includes a removable section above the slat floor so as to allow escape of air into the guide housing from a position above the slat floor.

11. The method according to claim 1 wherein at least the bottom wall has a plastics liner thereon for receiving the manure.

12. The method according to claim 1 wherein at least some of the walls have a covering thereon of an insulation material.

13. The method according to claim 1 wherein one end wall includes a fixed portion defining said bottom portion and substantially one half of an upper portion, the door forming substantially the other half, the door being formed of metal and there being provided a gate inside the door for containing the animals, the gate being openable to release the animals from the vessel.

14. A method of animal husbandry comprising:
   providing a plurality of rectangular animal containment vessels;
   each having a horizontal bottom wall, a horizontal top wall, two vertical end walls and two vertical side walls with the walls interconnected and structurally supported to define an integral, separately movable element;
   the walls being substantially closed so that each vessel is substantially closed;
   providing in each containment vessel a slat floor raised above the bottom wall to define a manure containment area on the top of the bottom wall and below the slat floor, the manure containment area being closed by bottom portions of the end walls and the side walls and including discharge means for discharging manure from the containment area;
   providing in each containment vessel an air flow inlet opening in one wall for injecting fresh air into the vessel and an air flow outlet opening in one wall for release of stale air from the vessel;
   providing in each containment vessel a door in the one end wall above the bottom portion so as to communicate with the vessel to allow entry into and exit from the vessel of the animals;
   providing in each containment vessel feeding means for feeding the animals in the vessel;
   raising the animals firstly in a farrowing pen at a farrowing location from birth to a first growth stage, which is the weanling stage;
   at the weanling stage moving the animals from the farrowing pen to one of the vessels in which they are transported to a weanling husbandry location;

at the husbandry location connecting the discharge means of said one of the vessels to a receptacle for manure and supplying feed to the feeding means of said one of the vessels and raising the animals in said one of the vessels from the first stage at least partly to a second stage, which is the grower stage;

at the grower stage transporting the animals in one of said vessels to a grower location and moving the animals from the vessel to a grower pen for finishing from the second stage to market weight.

15. The method according to claim 14 wherein said one of the vessels contains separate pens each for receiving one family of the animals from a single mother so that the different families are kept separate in the vessel.

16. The method according to claim 15 wherein the animals are moved from said one of the vessels to a second one of the vessels at the weanling location to provide a larger pen for each of the separate families pigs as they grow during the weanling stage.

17. The method according to claim 14 wherein at the weanling location there is provided a plurality of the vessels arranged in a row and an alleyway interconnecting the vessels at one end of the vessels.

18. A method of animal husbandry comprising:

raising animals at a production facility;

providing a rectangular animal containment vessel having a horizontal bottom wall, a horizontal top wall, two vertical end walls and two vertical side walls with the walls interconnected and structurally supported to define an integral, separately movable element;

the walls being substantially closed so that the vessel is substantially closed;

providing in the containment vessel a slat floor raised above the bottom wall to define a manure containment area on the top of the bottom wall and below the slat floor, the manure containment area being closed by bottom portions of the end walls and the side walls and including discharge means for discharging manure from the containment area;

providing in the containment vessel an air flow inlet opening in one wall for injecting fresh air into the vessel and an air flow outlet opening in one wall for release of stale air from the vessel;

providing in the containment vessel a door in the one end wall above the bottom portion so as to communicate with the vessel to allow entry into and exit from the vessel of the animals;

providing in the containment vessel feeding means for feeding the animals in the vessel;

transporting some of the animals from the production facility in the containment vessel to a husbandry location having a main facility for raising the animals;

at the husbandry location connecting the discharge means to a receptacle for manure and supplying feed to the feeding means and thereby temporarily raising the animals in the containment vessel while the animals in the containment vessel are maintained in quarantine from the animals in the main facility until the possibility of transfer of disease is determined;

whereupon the animals in the containment vessel are transferred to the main facility and the containment vessel is hygienically cleaned and returned to the production facility.

\* \* \* \* \*